(12) United States Patent
Simmonds

(10) Patent No.: US 6,806,755 B1
(45) Date of Patent: Oct. 19, 2004

(54) TECHNIQUE FOR GLITCHLESS SWITCHING OF ASYNCHRONOUS CLOCKS

(75) Inventor: Alan Christopher Simmonds, Morgan Hill, CA (US)

(73) Assignee: Quantum 3D, San Jose, CA (US)

( * ) Notice: Subject to any disclaimer, the term of this patent is extended or adjusted under 35 U.S.C. 154(b) by 0 days.

(21) Appl. No.: 10/412,103

(22) Filed: Apr. 10, 2003

Related U.S. Application Data

(63) Continuation-in-part of application No. 10/133,966, filed on Apr. 23, 2001, now Pat. No. 6,646,645.
(60) Provisional application No. 60/731,738, filed on Apr. 10, 2002, and provisional application No. 60/425,053, filed on Nov. 8, 2002.

(51) Int. Cl.[7] .............................................. G06F 1/04
(52) U.S. Cl. ...................................... 327/298; 327/99
(58) Field of Search .......................... 327/298, 3, 99, 327/144, 145

(56) References Cited

U.S. PATENT DOCUMENTS

| | | | | |
|---|---|---|---|---|
| 5,099,477 A | * | 3/1992 | Taniguchi et al. | 370/501 |
| 5,373,524 A | * | 12/1994 | Marie et al. | 372/60 |
| 5,610,558 A | * | 3/1997 | Mittel et al. | 331/2 |
| 6,069,507 A | * | 5/2000 | Shen et al. | 327/156 |
| 6,442,703 B1 | * | 8/2002 | Nakamura | 713/500 |
| 6,532,042 B1 | * | 3/2003 | Kim | 348/537 |
| 6,675,307 B1 | * | 1/2004 | Heitkamp et al. | 713/401 |
| 6,741,109 B1 | * | 5/2004 | Huang et al. | 327/156 |

* cited by examiner

*Primary Examiner*—Timothy P. Callahan
*Assistant Examiner*—Cassandra Cox
(74) *Attorney, Agent, or Firm*—James E. Eakin

(57) ABSTRACT

A technique for glitchless switching among different frequency input clocks in a circuit includes monitoring each of the clocks and determining when the relative phases of the respective clocks are within a predetermined maximum of phase difference. Once the relative phases of the respective clocks are within an acceptable range, the system switches from one clock to another.

1 Claim, 7 Drawing Sheets

The Clock Switching Circuit 100

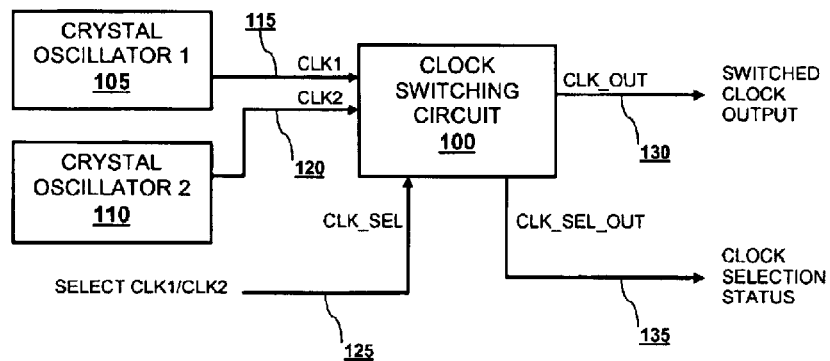
Figure 1 - Block Diagram of the Switching Circuit Switching Two Crystal Clock Sources

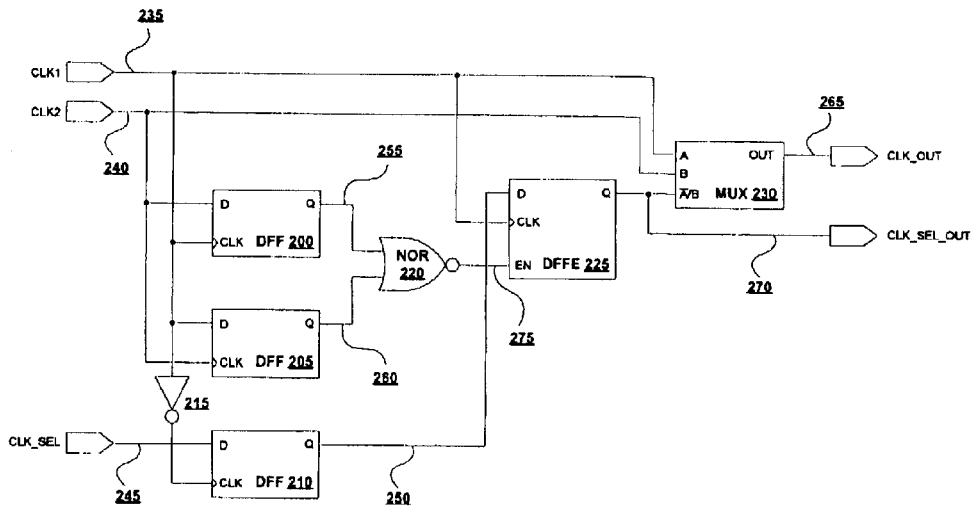
Figure 2 - The Clock Switching Circuit 100
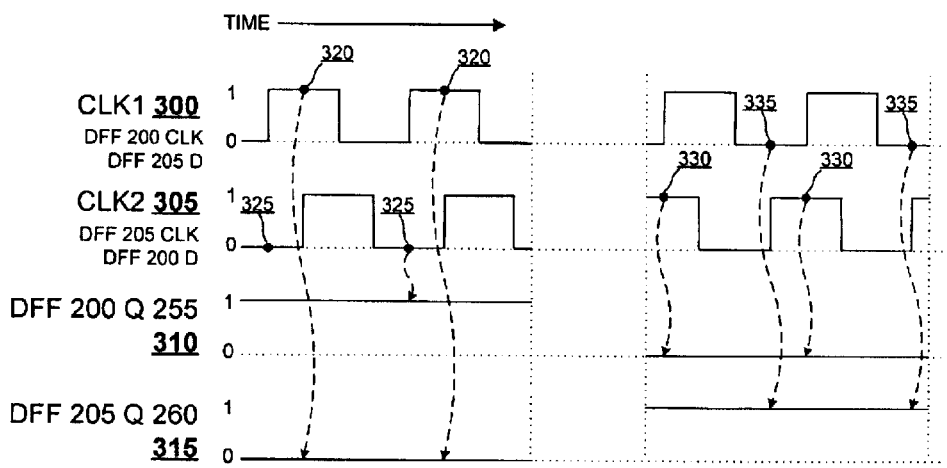
Figure 3 - Out of Phase Clocks and Registers 200 and 205

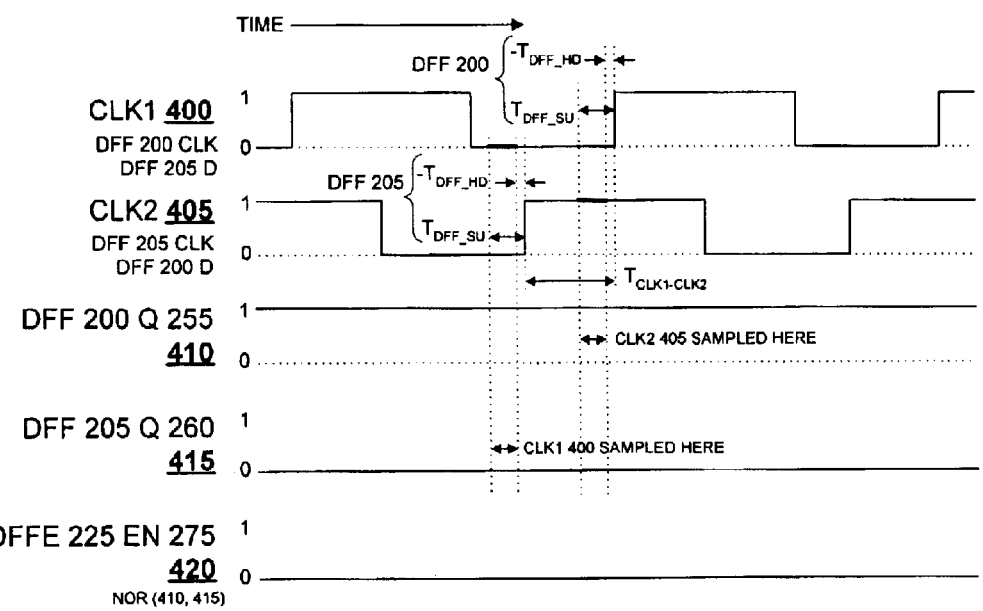
Figure 4 – DFF 225 EN Input 275 With Positive $T_{CLK1\text{-}CLK2}$

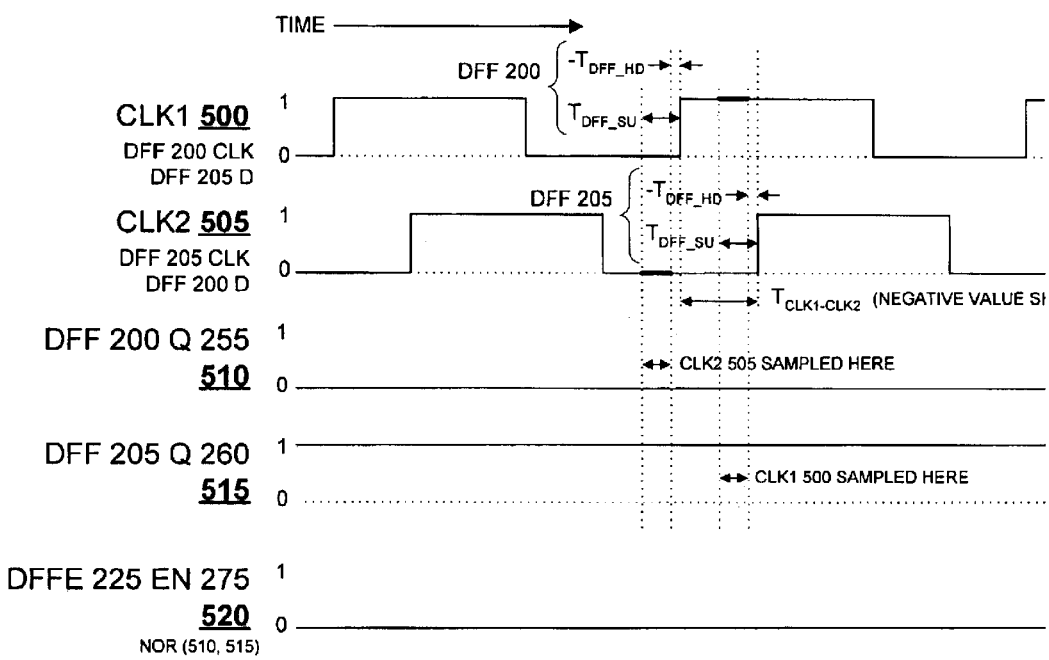
Figure 5 – DFF 225 EN Input 275 With Negative $T_{CLK1-CLK2}$

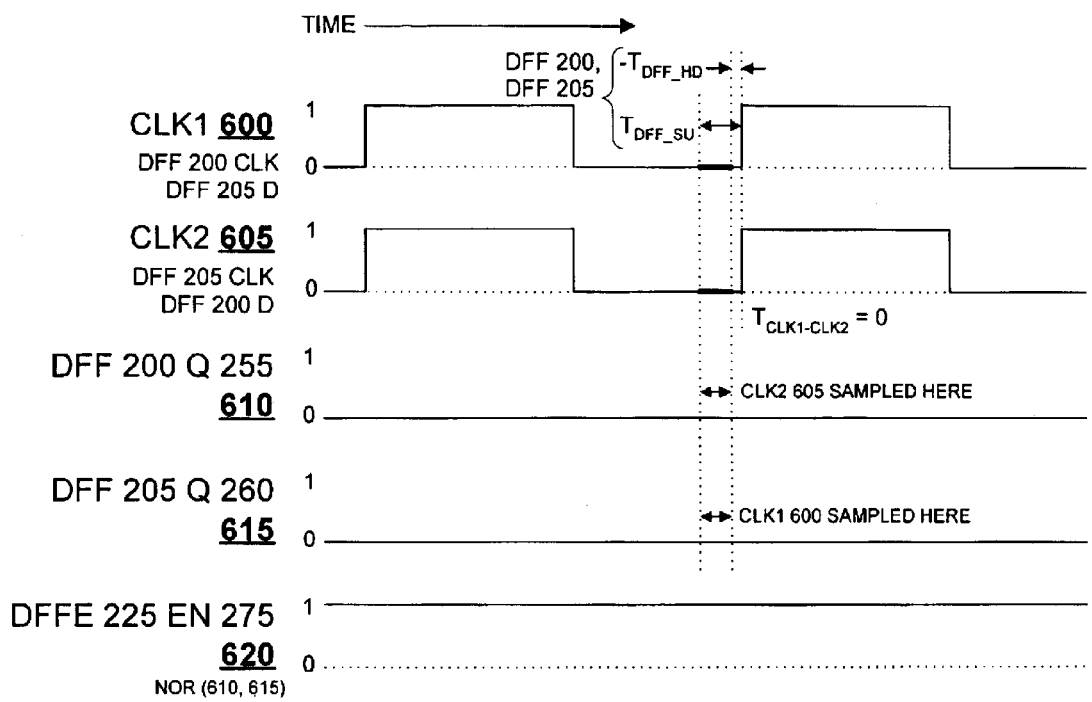
Figure 6 –DFF 225 EN Input 275 With Identical Clock Phase

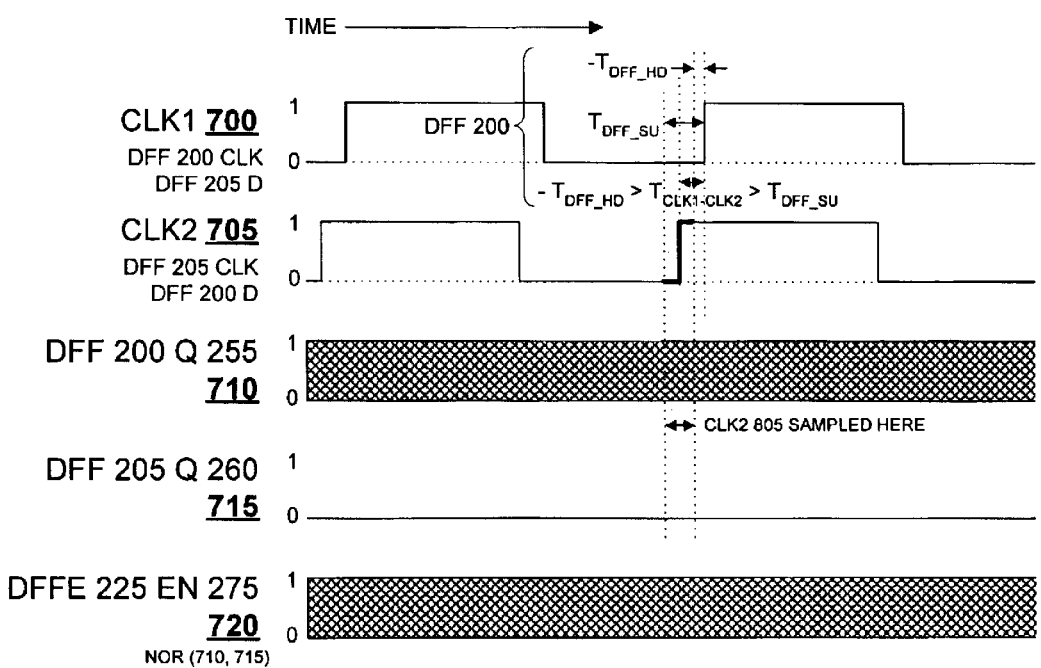
Figure 7 – Setup/Hold Time Violation and the DFF 225 EN Input

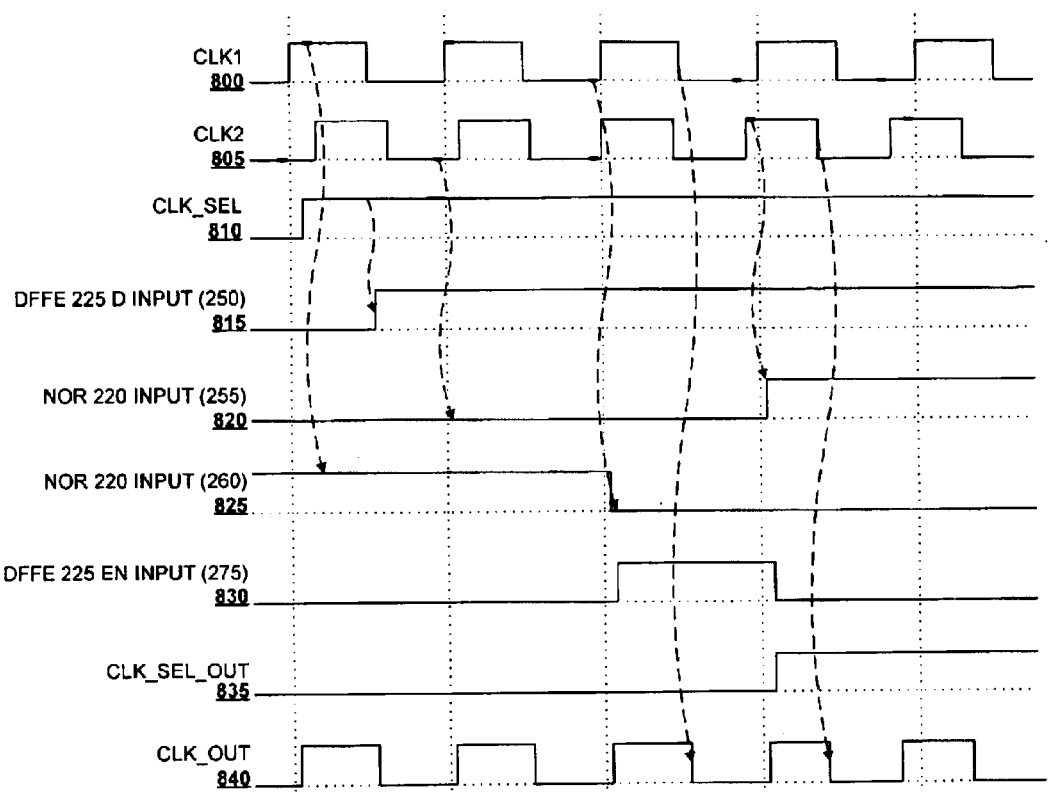
Figure 8 - Example Waveforms

TECHNIQUE FOR GLITCHLESS SWITCHING OF ASYNCHRONOUS CLOCKS

RELATED APPLICATIONS

This application claims the benefit of, and incorporates by reference, provisional U.S. Patent Application S.N. 60/371,738, filed Apr. 10, 2002, entitled System and Method for Visual Simulation Using Multiple Synchronized Graphical Computers, as well as provisional U.S. Patent Application S.N. 60/425,053, filed Nov. 8, 2002, entitled System and Method for Visual Simulation Using Multiple Synchronized Graphical Computers, with Antialiasing, and is a continuation-in-part of U.S. patent application Ser. No. 10/133966, entitled System and Method for Synchronization of Video Display Outputs from Multiple PC Graphics Subsystems, filed on Apr. 23, 2002 U.S. Pat. No. 6,646,645; and also incorporates by reference the following applications filed on even date herewith and having the same assignee as the present application:

1. Method For Distributed Operation of Applications, and System, Paul Slade, inventor, Ser. No. 10/412,102, Express mail no. EL947795507US.

2. System and Method for Controlled Performance Degradation on Failure, Alan Simmonds et al., inventors, Ser. No. 10/412,362, Express mail no. EL947795498US.

3. Multiple Subchannel Rendering System Using Digital Compositor, and Method Therefor, Alan Simmonds, et al., inventors, Ser. No. 10/411,962, Express mail no. EL947795484US.

4. Simultaneous Manipulation of Multiple Graphical User Interfaces, Charles Kuta, inventor, Ser. No. 10/412,129, Express mail no. EL947795475US.

SPECIFICATION

FIELD OF THE INVENTION

The present invention relates generally to methods and techniques for switching among input clocks in synchronous circuits, and more particularly relates to methods and techniques for switching among a plurality of input clocks with little or no phase change at the output.

BACKGROUND OF THE INVENTION

It is a common requirement in the field of digital electronics to require the switching between two similar input clock sources. Often, the input clocks are switched with a simple multiplexer without regard to the phase difference of the input clocks. The resulting output clock can experience a sudden phase change or even a very short transient pulse. These anomalies, or glitches, can cause incorrect behavior when this switched clock is used as reference inputs to PLLs (Phased Locked Loops), DLLs (Digital Locked Loops) or as clock inputs to state machines or other synchronous logic as these systems often have requirements for minimum high and low periods or minimum phase change.

One possible example of this would be the case of a high speed serial interface. This interface may need to work off a local reference clock during the datastream clock detection and then switch to the clock recovered from the datastream once detection has completed. Normally the reference clock will be very similar in frequency from the recovered clock (of the order of maybe 100 parts per million), but, due to crystal clock source tolerances, will not be exactly the same. Switching without regard to the phase of the clocks can result in a glitch.

To prevent glitch occurrence, many clock switching techniques, for example U.S. Pat. Nos. 5,197,126 and 6,472,909, suppress one or more clock pulses on the switched output at the time of switching. This may be acceptable for some logic circuits but is often unacceptable if used as the reference input to a PLL or DLL as the resulting clock output of these devices will often be unpredictable, causing problems in state machines or other synchronous logic. For the purposes of these circuits, and this invention, suppression of a clock pulse is henceforth also considered a glitch.

There has therefore been a need for a method for switching among asynchronous input clocks in a synchronous circuit without glitches in the output.

SUMMARY OF THE INVENTION

The present invention allows the selection between two clocks of similar, but not identical, frequencies without producing glitches, that is to say transient pulses, sudden phase change or suppressed clock edges. In an exemplary arrangement, the invention uses registers to detect the relative phase of the clocks and only allows the switching to occur when the phase difference between the clocks does not exceed a maximum permissible phase difference. This, combined with register timing parameters, permits switching among the clocks with no glitches and very small phase change at the output. The output of this circuit can be used to drive PLLs and other electronic circuitry that is sensitive to clock glitches.

The invention relies on the two input clocks being at different frequencies, even if only slightly different, and allows a switch from one to the other when the two clocks are substantially in phase. Because of this the switching may not be instantaneous.

THE FIGURES

FIG. 1 illustrates a typical application of a Clock Switching Circuit of the present invention in switching between two crystal frequency sources.

FIG. 2 illustrates one implementation of the Clock Switching Circuit in detail.

FIG. 3 illustrates out of phase clocks and the effect on registers 200 and 205 of the arrangement illustrated in FIG. 2.

FIG. 4 illustrates the effect of a large positive clock phase difference to the arrangement illustrated in FIG. 2.

FIG. 5 illustrates the effect of a large negative clock phase difference to the arrangement illustrated in FIG. 2.

FIG. 6 illustrates the effect of a clock phase match to the exemplary implementation of FIG. 2.

FIG. 7 illustrates the effect of register setup/hold time violation on the clock input registers in the exemplary implementation of FIG. 2.

FIG. 8 illustrates an example of input stimulus to the exemplary Clock Switching Circuit, and its response.

DETAILED DESCRIPTION OF THE INVENTION

The technique for glitchless switching of asynchronous clocks allows switching of two clock sources of similar, but not identical, frequencies without glitches, runt pulses or large phase changes.

The technique can readily be implemented in a programmable logic device such as an FPGA (field programmable gate array), ASIC (application specific integrated circuit) or in custom logic devices.

In an exemplary arrangement discussed herein, the technique is implemented in a Clock Switching Circuit 100. FIG. 1 shows a typical application of the Clock Switching Circuit 100 in switching between two crystal frequency sources, 105 and 110. Although only two clock sources such as 105 and 110 are shown, it will be understood that the present invention can also work with more than two sources. The Clock Switching Circuit 100 selects between the two clock inputs CLK1 115 and CLK2 120 based on the state of the CLK_SEL 125 clock select input. The selected clock is output on CLK_OUT 130 and confirmation of clock selection is indicated on CLK_SEL_OUT 135.

The exemplary Clock Switching Circuit 100 of FIG. 1 is shown in greater detail in FIG. 2. In this implementation, the circuit includes three registers 200, 205 and 225, a NOR gate 220 and a multiplexer 230. A fourth register 210 and an inverter 215 are also shown as an implementation of one possible method of metastability prevention but are not required in every embodiment. For the purposes of describing the operation of the Clock Switching Circuit 100, until the functionality of register 210 is discussed later, input changes on CLK_SEL 245 should be considered to be reflected in an identical change at the register DFFE 225 D input 250. Two clocks to be multiplexed are shown as CLK1 235 and CLK2 240, although other implementations may have additional clocks. An external device [not shown] would select which clock to use by driving CLK_SEL 245 low to select CLK1 235 and high to select CLK2 240. The multiplexed clock output is provided on CLK_OUT 265. Confirmation that the switch has occurred can be fed back to the external stimulating device via the CLK_SEL_OUT 270 signal.

Registers 200, 205 and 225 must have the properties of the following table. Note, this table is simplified and does not show restrictions of D or EN with regard to CLK setup or hold requirements or CLK input to Q output delays. 'X' signifies a don't care state. A suggested implementation would be using a D-Type flip-flop.

Register 200, 205, 210 and 225 Truth Table

| D | EN (225 only) | CLK | Q |
|---|---|---|---|
| X | X | Fall | Q |
| X | X | 0 | Q |
| X | X | 1 | Q |
| 0 | 0 | Rise | Q |
| 1 | 0 | Rise | Q |
| 0 | 1 | Rise | 0 |
| 1 | 1 | Rise | 1 |

The first two registers, DFF 200 and 205, are used to register one clock (as data) by using the other (as clock). Register DFF 200 will register the state of CLK2 240 when CLK1 235 rises. Register DFF 205 will register the state of CLK1 235 when CLK2 240 rises. FIG. 3 shows the state of registers 200 and 205 for two general out of phase cases, CLK1 300 leading CLK2 305 and CLK2 305 leading CLK1 300. As can be seen, the outputs of the registers 310 and 315 will always be non-matched values when the clocks are out of phase (one will be a '1' and one will be a '0'). As shown in more detail later, the output from registers DFF 200 and DFF 205 will only be simultaneously 0 when CLK1 235 and CLK2 240 are identical, or nearly identical, in phase. The output from these registers will be different from each other when the clocks are not in phase. A NOR gate 220 is used to translate this into a '1' at its output 275 whenever the two clocks (235 and 240) are in phase and '0' when out of phase. This signal connects to the EN (enable) pin of the DFFE 225, which has the effect of only allowing the DFFE 225 to register the CLK_SEL 245 value onto its Q output 270 only when the two clocks (235 and 240) are in phase.

The registered output 270 drives the multiplexer $\overline{A}/B$ input, which selects CLK1 235 when the $\overline{A}/B$ input 270 is '0' and CLK2 240 when the $\overline{A}/B$ input is '1'. Hence the CLK_SEL 245 input will only have influence over the switching when the clocks (235 and 240) are in phase. This, along with further details below, guarantees glitchless clock switching of the clocks.

The DFFE 225 Q output 270 also drives the CLK_SEL_OUT from the circuit, which can be used to indicate if the switch requested at CLK_SEL 245 has occurred. A match of CLK_SEL 245 and CLK_SEL_OUT 270 would indicate that the Clock Switch Circuit has switched to the requested clock.

To describe the detailed operation of the exemplary implementation shown in the Figures, the following definitions will be used:

$T_{CYC}$ The base cycle time of CLK1 235 and CLK2 240 (which are not identical, but ignoring the frequency tolerance).

$T_{CYC/2}$ Half $T_{CYC}$ $T_{CLK1\text{-}CLK2}$ Delay from CLK1 235 rising to CLK2 240 rising at the input to the Clock Switching Circuit 100. This is defined by the current phase difference between the two clocks, and will change over time due to frequency tolerance from the base frequency.

$T_{DFF\_SU}$ The minimum D (data) or EN (enable) input setup time to CLK (clock) input of the registers (200, 205, 225) used in the Clock Switching Circuit 100 to guarantee the D input is registered.

$T_{DFF\_HD}$ The minimum D (data) or EN (enable) input hold time to CLK (clock) input of the registers (200, 205, 225) used in the Clock Switching Circuit 100 to guarantee the D input is registered.

$T_{CLK\_Q}$ The maximum delay from CLK (clock) input to the registers (200, 205, 225) used in the Clock Switching Circuit 100 to when the Q (output) is valid.

Using the variables defined above, FIG. 4 shows the output of DFF 200 (410) and DFF 205 (415), and the DFFE 225 EN input 420 (output of NOR 220) for a positive value of $T_{CLK1\text{-}CLK2}$ that is of a phase difference too large for the circuit to enable the registering of the CLK_SEL 245 input. As can be seen, DFF 200 registers the '1' level of CLK2 405 on its Q output 410 while DFF 205 registers the '0' level of CLK1 400 on its Q output 415. The result of the NOR 220 of the two DFF Q outputs (410 and 415) creates a '0' level on the DFFE 225 EN 275 input 420, causing it to retain any previously loaded CLK_SEL 245 value.

FIG. 5 shows the same signals but for a negative value of $T_{CLK1\text{-}CLK2}$, which is also too large for the circuit to enable the registering of the CLK_SEL 245 input. Here, DFF 200 registers the '0' level of CLK2 505 on its Q output 510 while DFF 205 registers the '1' level of CLK1 500 on its Q output 515. Again, the resulting NOR 220 of the two DFF Q outputs (510 and 515) creates a '0' level on the DFFE 225 EN 275 input 520, causing it to retain any previously loaded CLK_SEL 245 value.

FIG. 6 shows CLK1 600 and CLK2 605 matched in phase. Both DFF 200 and DFF 205 register the '0' value of CLK2 605 or CLK1 600, respectively. The result of the NOT 220 of the two DFF Q outputs (510 and 515) creates a '1' level on the DFF 225 EN input 620, causing it to load the value of CLK_SEL 245, which, if this has changed, will cause the clock multiplexer 230 to switch between the clocks.

FIG. 6 also shows that it is a requirement of the Clock Switching Circuit 100 to have a negative $T_{DFF\_HD}$ for the registers (200, 205 and 225). If $T_{DFF\_HD}$ were positive, data (the CLK1 235 or CLK2 240 inputs) would need to remain unchanged at the register D input until after the CLK input rises for that D value to be registered. If this were the case in FIG. 6, both DFF 200 and DFF 205 outputs (610 and 615) would be undefined due to setup/hold time violation and the circuit's operation would not be guaranteed. However, with a negative $T_{DFF\_HD}$, there is a region of phase difference $T_{CLK1\text{-}CLK2}$ values from $T_{DFF\_HD}$ to $-T_{DFF\_HD}$ where both outputs will be guaranteed at logic level 0. It is at this phase difference that the Clock Switching Circuit 100 will allow the SEL_CLK input to register into DFFE 225 Q output 270 and influence the clock multiplexer 230. If a CLK_SEL change is registered into the DFFE 225 Q output 270, the clock output 265 will glitchlessly switch between the input clocks (235 and 240).

Where negative $T_{DFF\_HD}$ is not available it may be engineered by adding a delay component to the DFF D input path.

If the phase difference of the CLK1 235 and CLK2 240 inputs makes $T_{CLK1\text{-}CLK2}$ outside the $T_{DFF\_HD}$ to $-T_{DFF\_HD}$ region, but inside the $-T_{DFF\_SU}$ to $T_{DFF\_SU}$ region, the operation of the Clock Switching Circuit is undefined due to register setup/hold time violation: it may or may not allow registering of the CLK_SEL input into the DFFE 225 Q output 270. This has the potential of increasing the phase difference $T_{CLK1\text{-}CLK2}$ where switching is allowed but doesn't cause circuit malfunction. This is shown in FIG. 7, where DFF 200 is experiencing this setup/hold time violation. Here the CLK2 705 input to the DFF 200 D input is changing during the setup/hold time period. The output of DFF 200 Q 710 will be undefined. The resulting NOR 220 of the DFF Q outputs 710 and 715, which connect to the DFFE 225 EN input 720, will also be undefined, making it impossible to predict whether DFFE 225 will register the CLK_SEL 245 value or not. In this condition the circuit may or may not allow a clock switch to occur.

In summary, it can be seen that the Clock Switching Circuit 100 will only guarantee switching of the clocks 235 and 240 when the phase between these clocks $T_{CLK1\text{-}CLK2}$ is between $T_{DFF\_HD}$ and $-T_{DFF\_HD}$ but may also switch when the phase between these clocks $T_{CLK1\text{-}CLK2}$ is between $-T_{DFF\_SU}$ and $T_{DFF\_SU}$. The Clock Switching Circuit can only be guaranteed to operate if $T_{DFF\_HD}$ is negative.

For instances where $T_{DFF\_HD}$ is not negative, a negative $T_{DFF\_HD}$ may be engineered by adding a delay component to the DFF (200 and 205) D input path. However this will also increase the setup time required at the registers which is likely to reduce the maximum clock speed of the design.

To guarantee that there is no chance that the DFFE 225 Q output 270 can become metastable, DFF 210 is used to register CLK_SEL 245 on the falling edge of CLK1 235 (which is inverted by the inverter 215). Metastability could happen if the D input 250 of DFFE 225 were to violate CLK1 235 setup or hold time. Should there still be a problem of potential setup or hold violation at DFFE 225, further adjustment to the delay of the CLK_SEL 245 signal can be made by adding delay stages or a combination of registering on non-inverted CLK1 235 and added delay stages.

If $T_{CLK\_Q}$ is greater than the maximum $T_{CLK1\text{-}CLK2}$ that may generate a DFFE EN 275 input at level 1 then the multiplexer 230 is guaranteed to switch the clocks with no glitches. This means $T_{CLK\_Q}$ must be greater than $T_{DFF\_SU}$. If this is not the case, a small delay element can be added between the DFFE 225 register and the multiplexer 230 to effectively increase the $T_{CLK\_Q}$ of the DFFE 225.

As an example, the following delay values may be read from an FPGA datasheet for its D-Type flip-flop register component:

$T_{DFF\_SU}$ 0.37 ns
$T_{DFF\_HD}$ −0.09 ns
$T_{CLK\_Q}$ 0.44 ns

Here, there is a window of $T_{CLK1\text{-}CLK2}$ of −0.09 ns to 0.09 ns where the Clock Switching Circuit 100 shown in FIG. 2 is guaranteed to allow the CLK_SEL 245 input to effect the clock selection at the CLK_OUT 265 output. There is also a region from −0.37 ns to 0.37 ns where this switching may (or may not) be allowed. Also, the $T_{CLK\_Q}$ value of 0.44 ns (which is greater than the $T_{DFF\_SU}$ time of 0.37 ns) guarantees that switching will occur at the CLK_OUT output without glitches.

If there is a metastability issue at output of the DFFE 225 (maybe due to the CLK1 235 and CLK2 240 frequency being so high that a metastable output will not settle in one $T_{CYC/2}$ period), an extra register can be added between the NOR gate 220 and the DFFE 225 or the DFFE 225 and the multiplexer 230.

The Clock Switching Circuit 100 has to wait for the two clocks to become aligned before a switch will be allowed. This will produce an indeterminate delay between CLK_SEL changing and the clock switch occurring, especially if the clocks are very accurately matched. In designs where this delay is not acceptable, the delay might be decreased by adding a spread spectrum component to one or both of the clocks. It might also be possible to adjust the phase of one or the other clock using a PLL or DLL until alignment occurs. For any application it should be possible to calculate the statistical probability of how long it will take for before the clocks will be aligned within the $T_{DFF\_HD}$ to $-T_{DFF\_HD}$ window.

FIG. 8 illustrates an example of input stimulus to the Clock Switching Circuit and its response. Here CLK1 800 is slightly slower that CLK2 805. The system starts by having CLK1 800 selected but then CLK_SEL 810 changes state to request selection of CLK2 805. Signal 815 follows the CLK_SEL 810 input after the next falling edge of CLK1 800 (dues to DFF 210). Only when CLK1 800 and CLK2 805 are aligned does the NOR 220 inputs 820 and 825 become 0, causing DFFE 225 to register the clock selection 815 value, allowing the CLK2 805 to be selected and output to CLK_OUT 840 by the multiplexer 230. CLK_SEL_OUT 835 reflects the multiplexer 230 state.

For the circuit to switch a clock that may at some point fail (such as an external clock from a removable cable), the clock can first be fed into a phase locking PLL and then the frequency matched PLL output can be used to drive the CLK1 or CLK2 clock input of the Clock Switching Circuit instead of the external clock. This has the effect of making this clock input continue for some time after the external clock has stopped. An example circuit that might benefit from this feature would be U.S. patent application 20020180725, which describes a circuit that includes a PLL to detect external clock loss and a multiplexer to switch between the external clock source and a reference clock oscillator when that loss occurs. If an equal frequency output of the PLL were used to drive one clock input of the Clock Switching Circuit and the reference clock were used to drive the other, this clock switching could be performed glitchlessly.

Another method of supporting clock failure, of at least CLK2 240 would be to provide an override to the DFFE 225 EN 275. If the output of NOR 220 is ORed with an external override stimulus before being driven to the EN input of DFF 225, driving this stimulus with '1' will allow changes in CLK_SEL 245 to propagate to the multiplexor 230 without waiting for phase alignment. Normal operation would be resumed when this stimulus is returned to '0'. A requirement of this method would be that CLK1 235 clocking continues operating.

Another application for this circuit is for its use as a phase detector. The outputs of DFF 200 and DFF 205 can be used to indicate if CLK1 235 is ahead of CLK2 240 (DFF 200 will output 0 and DFF 205 will output 1), behind CLK2 240 (DFF 200 will output 1 and DFF 205 will output 0) or aligned (both DFFs will output 0).

Having fully described a plurality of embodiments of the invention, including various alternatives and equivalents, those skilled in the art will recognize that numerous other alternatives and equivalents also exist which fall within the scope of the invention, and are intended to be covered hereby. As a result, the invention is not to be limited by the foregoing description, but only by the appended claims.

What is claimed is:

1. In a circuit, a method for switching among at least two clocks of different frequencies comprising the steps of providing a first input clock of a first frequency, providing a second input clock of a second frequency, different from the first frequency, monitoring the relative phase difference between the first and second clocks, detecting when the relative phase difference is less than a permissible maximum, switching from the first clock to the second clock when the phase difference is less than the permissible maximum.

\* \* \* \* \*